US012507029B2

(12) United States Patent
Law et al.

(10) Patent No.: US 12,507,029 B2
(45) Date of Patent: Dec. 23, 2025

(54) AUDIO SIGNAL ISOLATION RELATED TO AUDIO SOURCES WITHIN AN AUDIO ENVIRONMENT

(71) Applicant: SHURE ACQUISITION HOLDINGS, INC., Niles, IL (US)

(72) Inventors: Daniel Law, Glencoe, IL (US); Michael Lester, Buena Vista, CO (US); Gavin Baker, Niles, IL (US); Christian Yost, Niles, IL (US); Iris Lorente, Park Ridge, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 286 days.

(21) Appl. No.: 18/199,212

(22) Filed: May 18, 2023

(65) Prior Publication Data

US 2023/0379648 A1 Nov. 23, 2023

Related U.S. Application Data

(60) Provisional application No. 63/344,384, filed on May 20, 2022.

(51) Int. Cl.
*H04S 7/00* (2006.01)
*G10L 21/0216* (2013.01)
(Continued)

(52) U.S. Cl.
CPC ............... *H04S 7/303* (2013.01); *H04R 1/32* (2013.01); *H04R 5/04* (2013.01); *H04S 2400/01* (2013.01); *H04S 2400/15* (2013.01)

(58) Field of Classification Search
None
See application file for complete search history.

(56) References Cited

U.S. PATENT DOCUMENTS

2017/0366896 A1* 12/2017 Adsumilli .............. H04N 23/60
2019/0289418 A1* 9/2019 Jang ........................ H04S 7/304
(Continued)

FOREIGN PATENT DOCUMENTS

EP 4210352 A1 * 7/2023 ............. H04S 7/302
WO 2022/014326 A1 1/2022

OTHER PUBLICATIONS

International Search Report and Written Opinion (ISA/EP) mailed Aug. 1, 2023 for International Application No. PCT/US23/067163, 14 pages.

*Primary Examiner* — Qin Zhu
(74) *Attorney, Agent, or Firm* — Alston & Bird LLP

(57) ABSTRACT

Techniques for isolating audio signals related to audio sources within an audio environment are discussed herein. Examples may include receiving a plurality of audio data objects. Each audio data object includes digitized audio signals captured by a capture device positioned within an audio environment. Examples may also include inputting the audio data objects to a source localizer model that is configured to generate, based on the audio data objects, one or more audio source position estimate objects. Examples may also include inputting the audio data objects and each audio source position estimate object to a source generator model of one or more source generator models. The source generator model is configured to generate, based on the audio source position estimate object, a source isolated audio output component. The source isolated audio output component may include isolated audio signals associated with an audio source within the audio environment.

20 Claims, 9 Drawing Sheets

(51) Int. Cl.

| | |
|---|---|
| ***G10L 21/0272*** | (2013.01) |
| ***H04R 1/32*** | (2006.01) |
| ***H04R 3/00*** | (2006.01) |
| ***H04R 5/04*** | (2006.01) |

(56) References Cited

U.S. PATENT DOCUMENTS

| | | | | |
|---|---|---|---|---|
| 2022/0159403 | A1 | 5/2022 | Sporer et al. | |
| 2023/0254655 | A1* | 8/2023 | Yamamoto | H04S 1/007<br>381/303 |
| 2023/0269552 | A1* | 8/2023 | Enenkl | G10L 19/008<br>700/94 |

* cited by examiner

AUDIO SIGNAL ISOLATION RELATED TO AUDIO SOURCES WITHIN AN AUDIO ENVIRONMENT

CROSS REFERENCE TO RELATED APPLICATIONS

This application claims the benefit of U.S. Provisional Patent Application No. 63/344,384, titled "AUDIO SIGNAL ISOLATION RELATED TO AUDIO SOURCES WITHIN AN AUDIO ENVIRONMENT," and filed on May 20, 2022, the entirety of which is hereby incorporated by reference.

TECHNICAL FIELD

Embodiments of the present disclosure relate generally to audio processing and, more particularly, to microphone systems.

BACKGROUND

A microphone system may employ beamforming microphone arrays to capture audio from one or more directions. However, noise is often introduced during audio capture related to beamforming microphone arrays or other microphones in a microphone system.

BRIEF SUMMARY

Various examples of the present disclosure are directed to apparatuses, systems, methods, and computer readable media for isolating audio signals related to audio sources within an audio environment. These characteristics as well as additional features, functions, and details of various embodiments are described below. The claims set forth herein further serve as a summary of this disclosure.

BRIEF DESCRIPTION OF THE DRAWINGS

Figure 1:
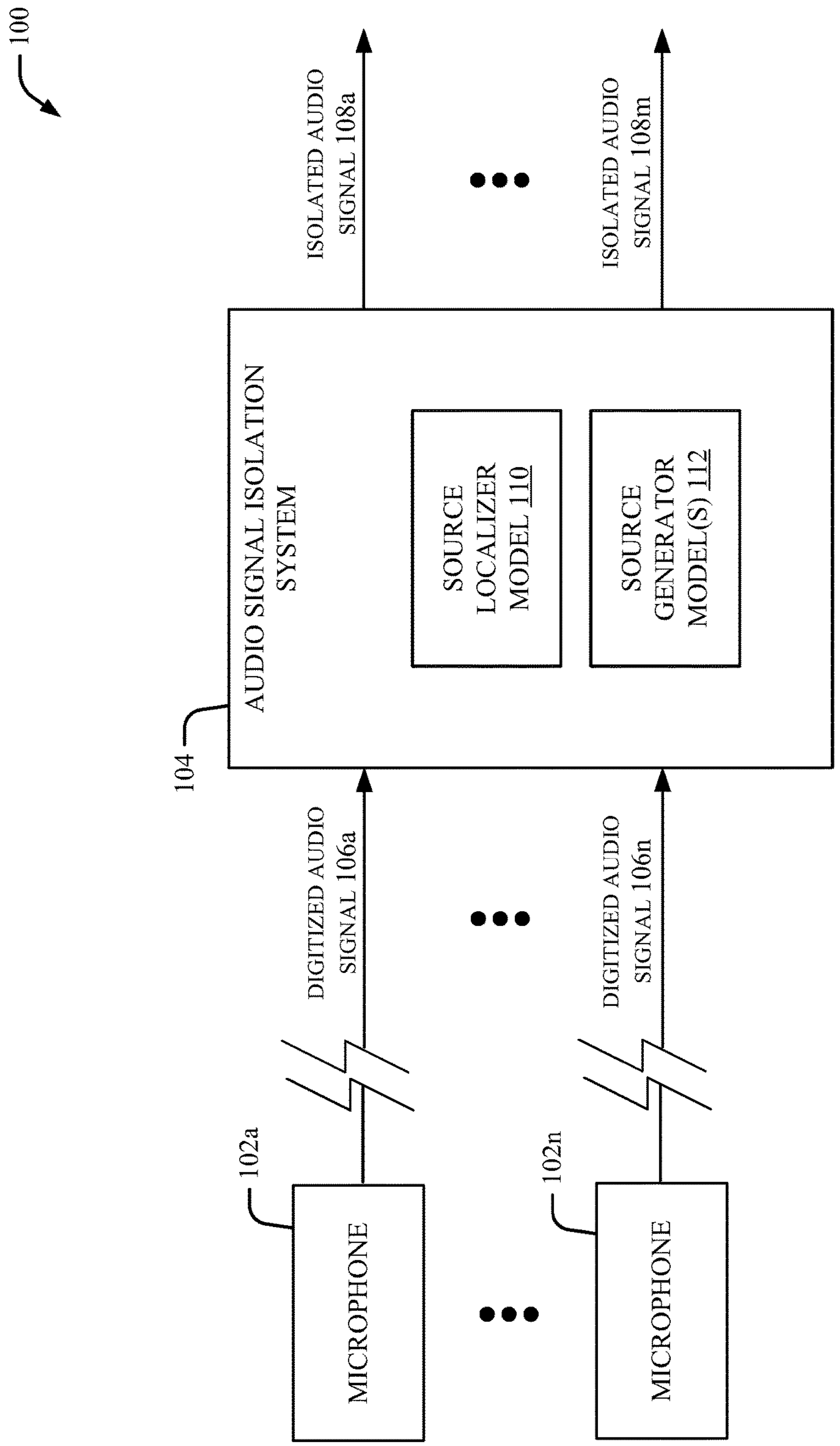
Figure 2:
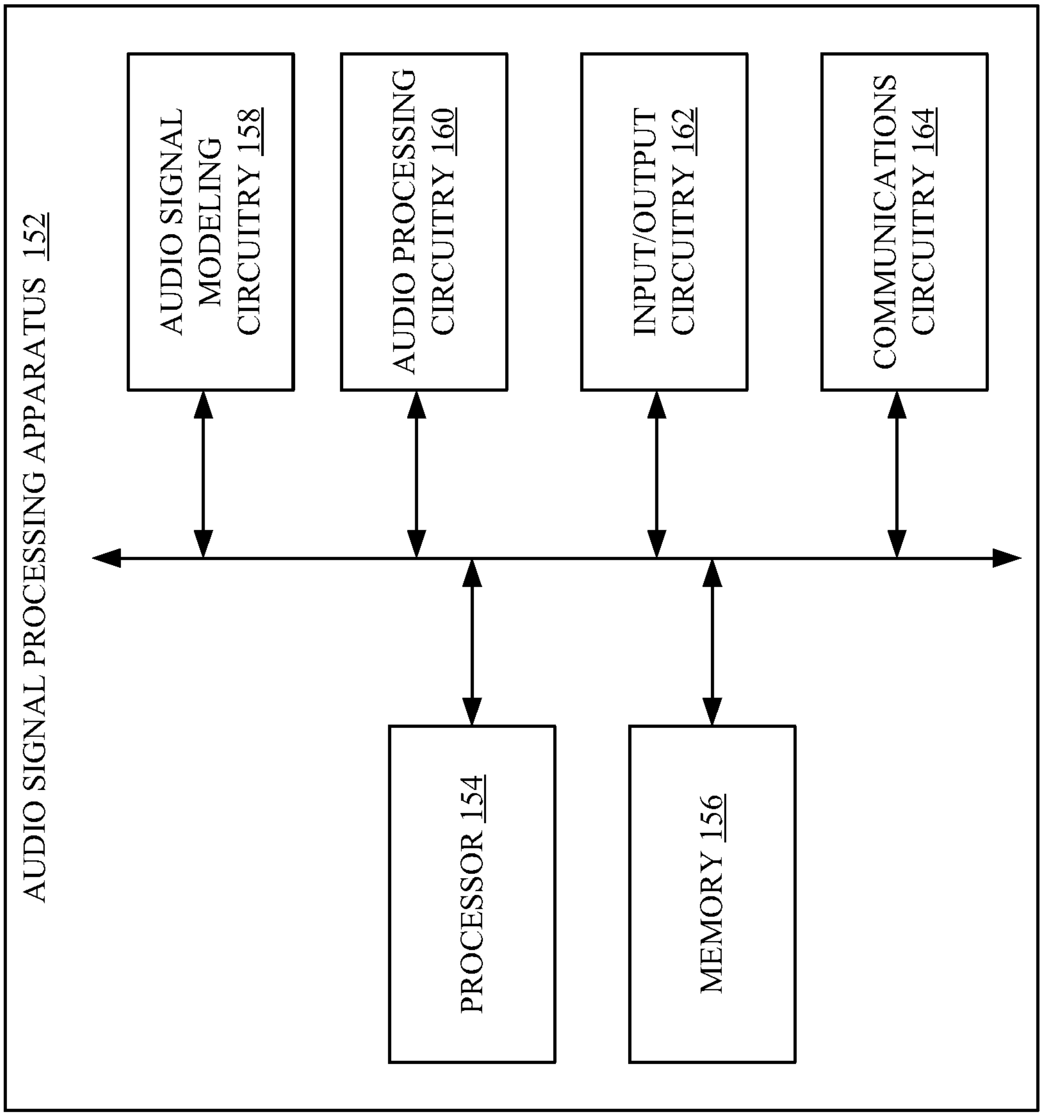
Figure 3:
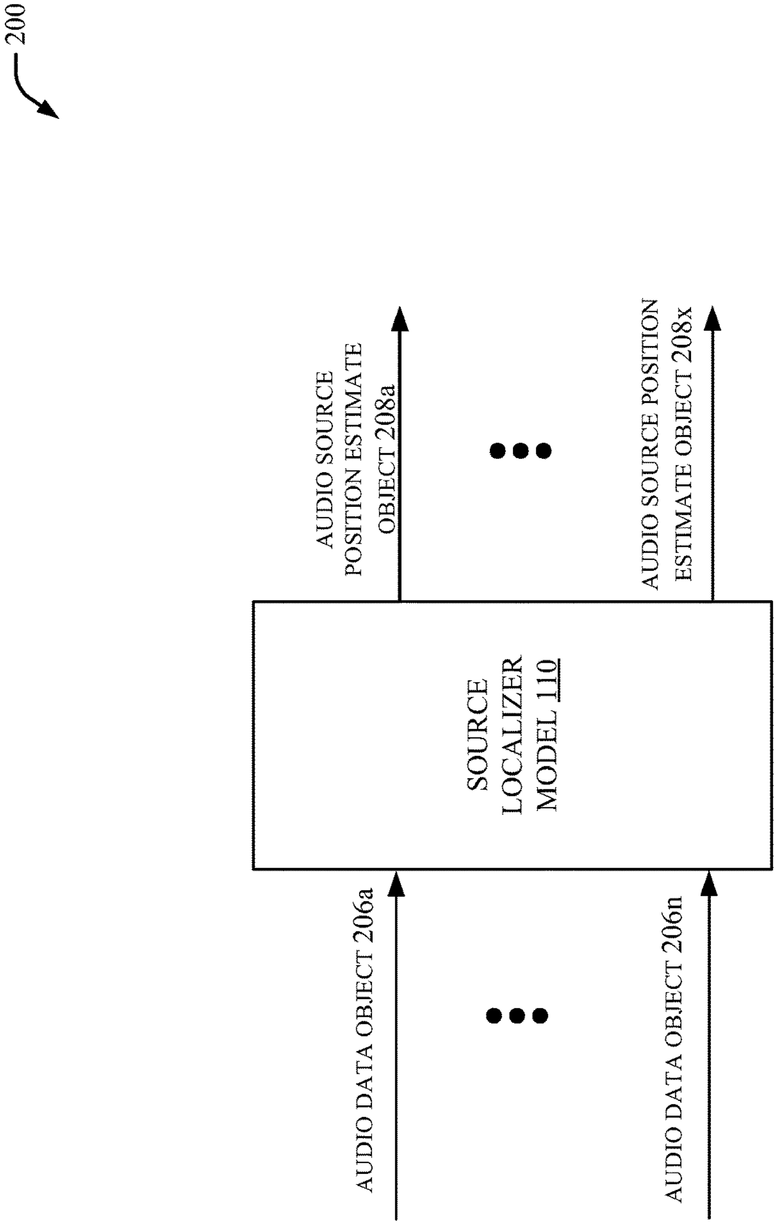
Figure 4:
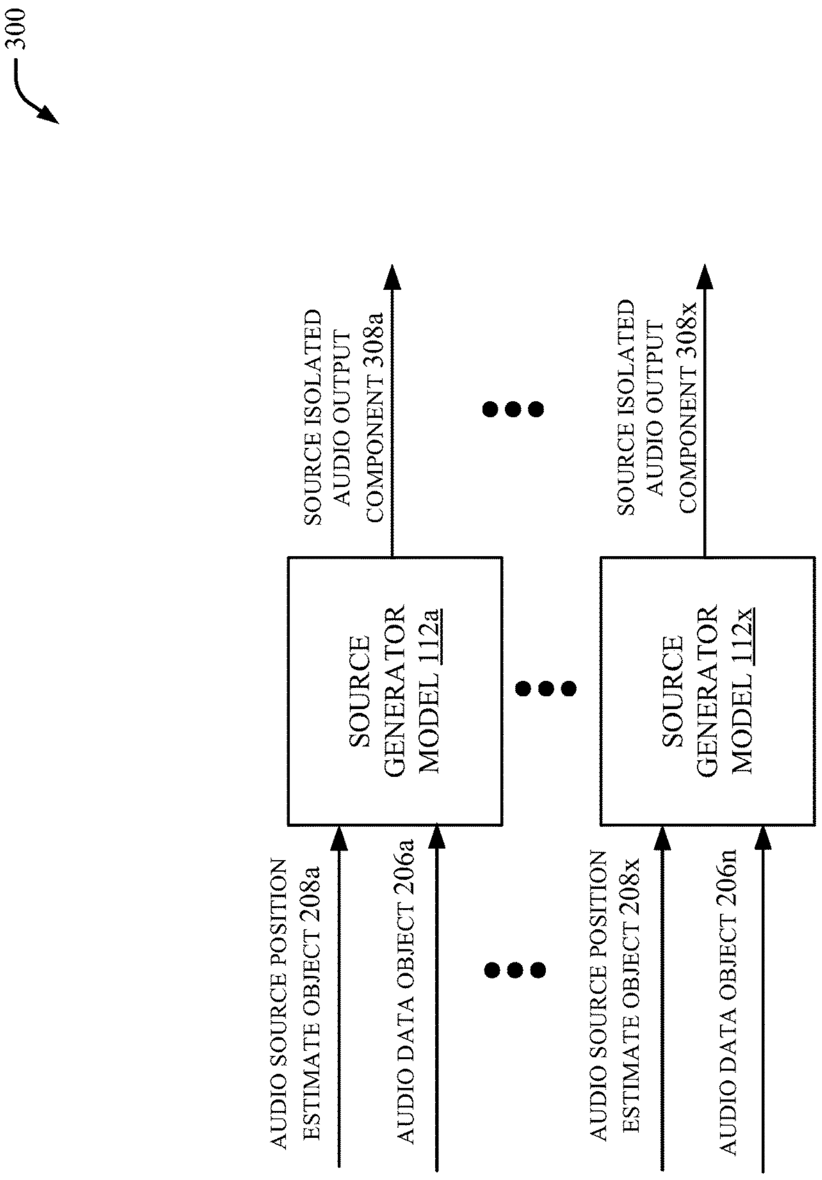
Figure 5:
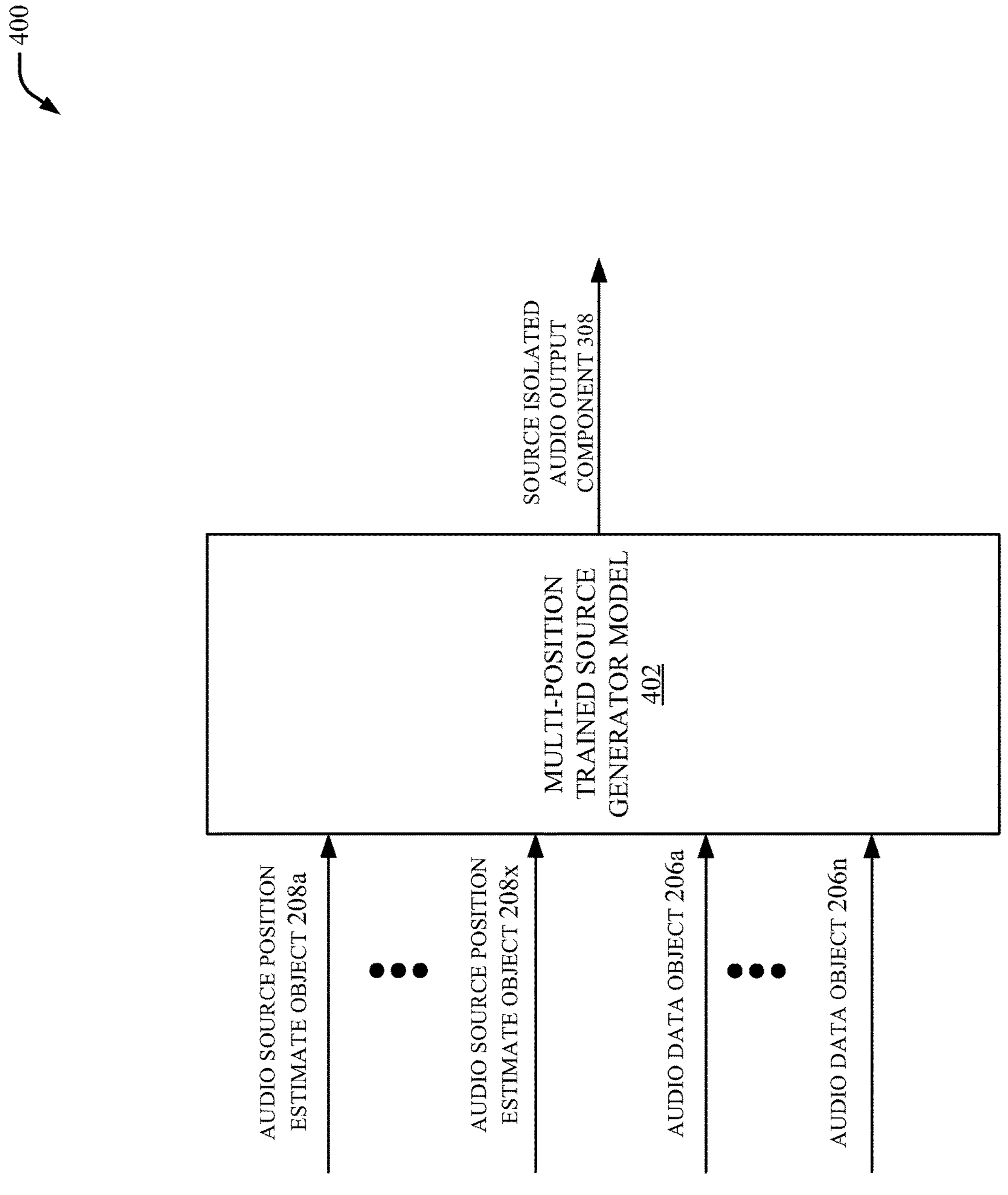
Figure 6:
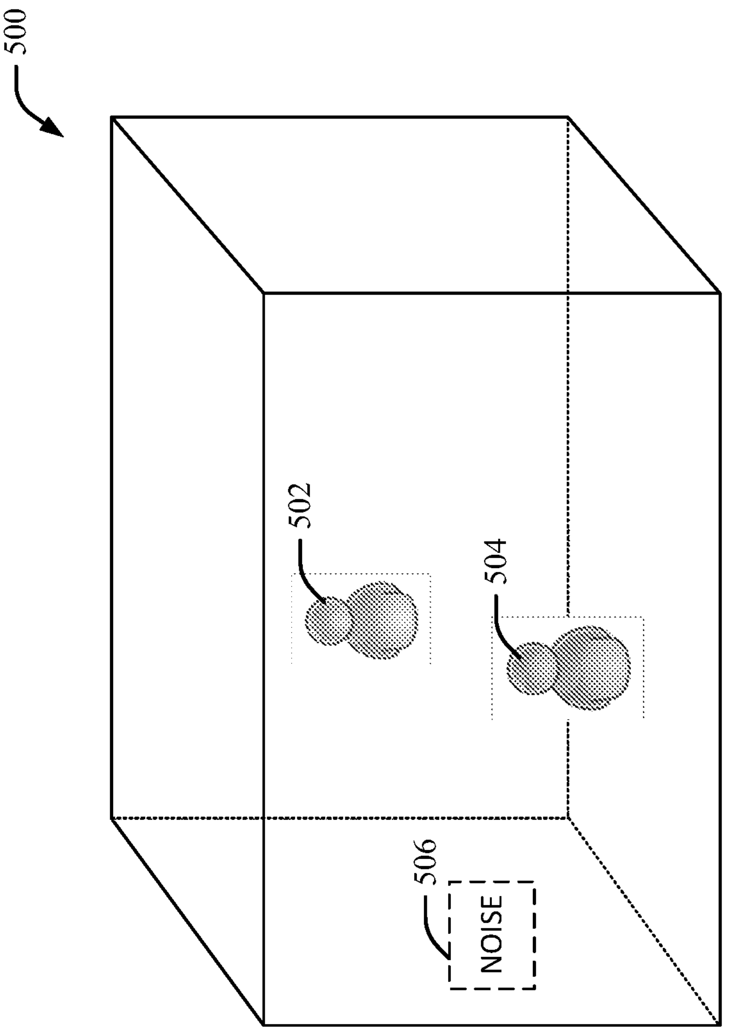
Figure 7:
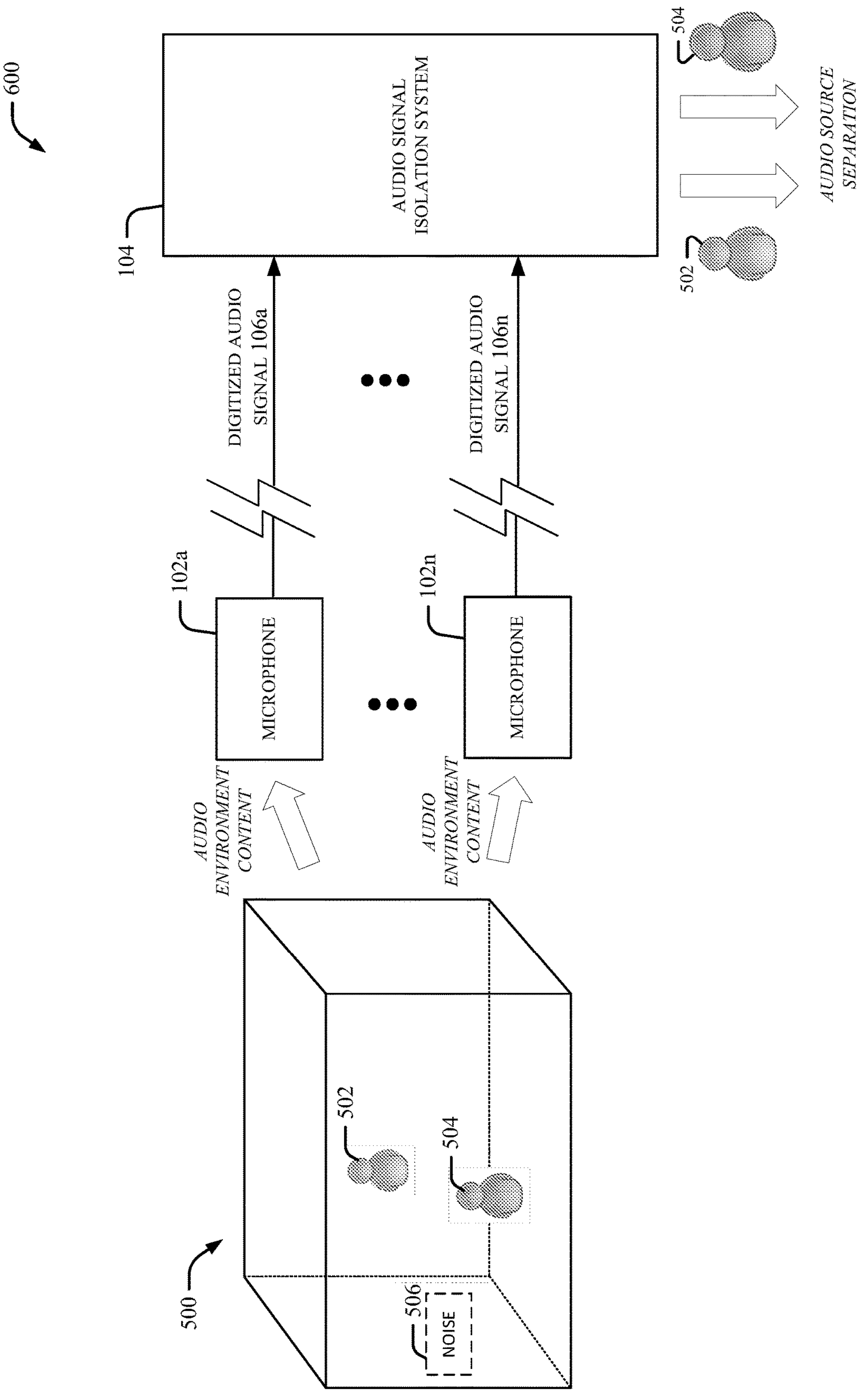
Figure 8:
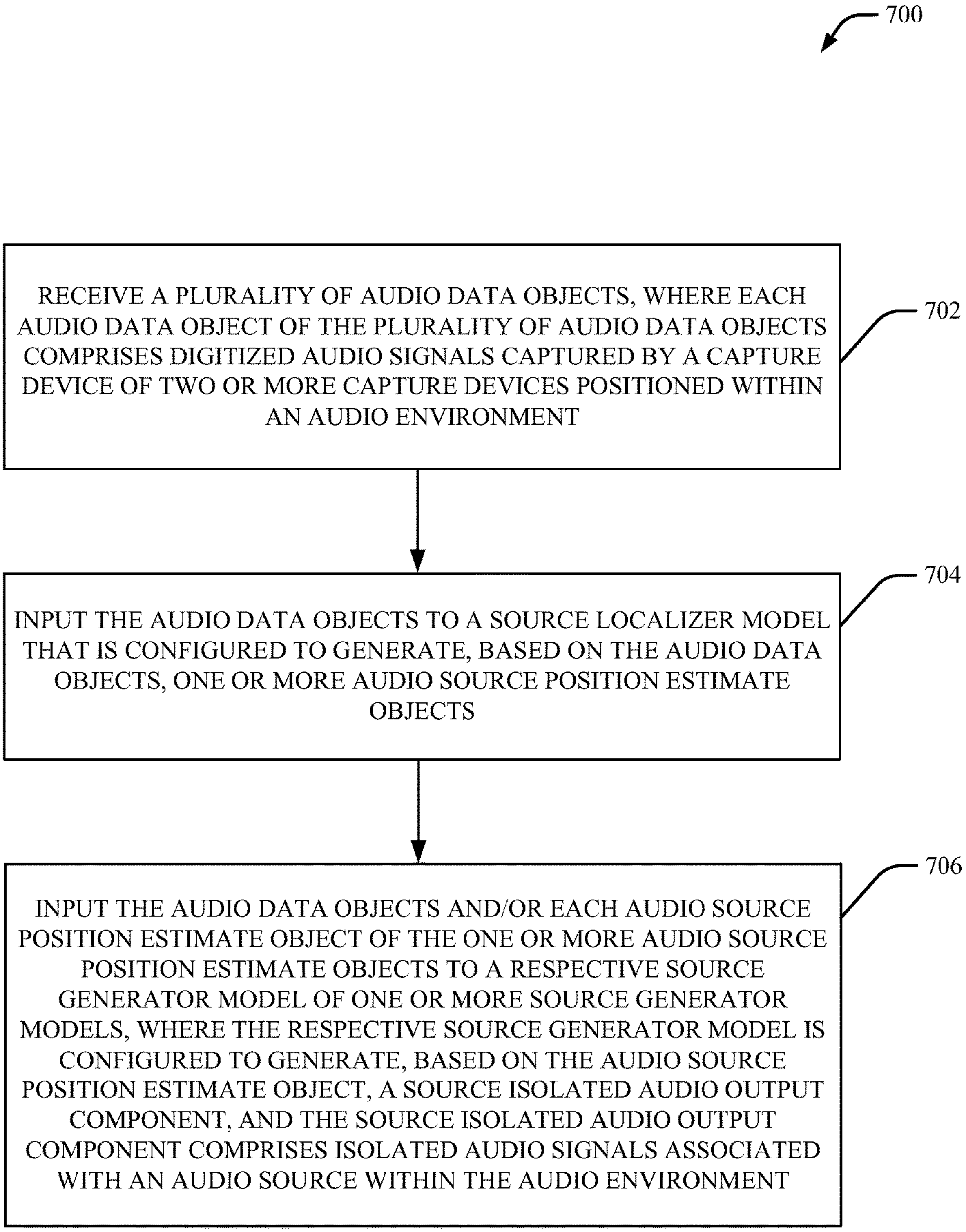
Figure 9:
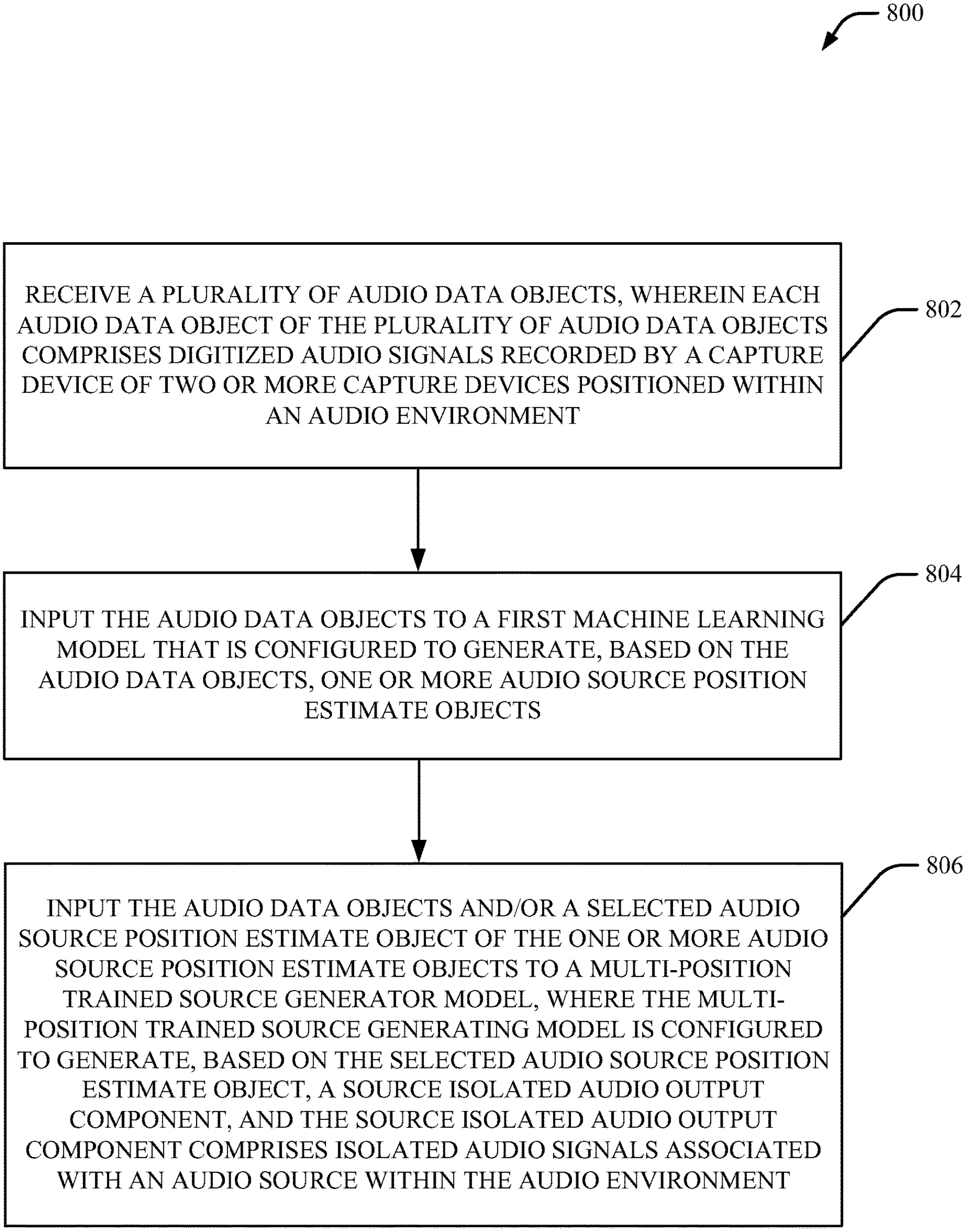

Having thus described some embodiments in general terms, reference will now be made to the accompanying drawings, which are not necessarily drawn to scale, and wherein:

FIG. 1 illustrates an example audio signal processing system that comprises microphones and an audio signal isolation system in accordance with one or more embodiments disclosed herein;

FIG. 2 illustrates an example audio signal processing apparatus configured in accordance with one or more embodiments disclosed herein;

FIG. 3 illustrates an example subsystem for audio signal isolation that is configured to provide audio signal modeling related to localization and/or classification in accordance with one or more embodiments disclosed herein;

FIG. 4 illustrates an example subsystem for audio signal isolation that is configured to provide audio signal modeling related to separation and/or spatialization of audio sources in accordance with one or more embodiments disclosed herein;

FIG. 5 illustrates another example subsystem for audio signal isolation that is configured to provide audio signal modeling related to separation and/or spatialization of audio sources in accordance with one or more embodiments disclosed herein;

FIG. 6 illustrates another example audio environment in accordance with one or more embodiments disclosed herein;

FIG. 7 illustrates an example audio signal processing system that provides audio source separation for one or more audio sources in an audio environment in accordance with one or more embodiments disclosed herein;

FIG. 8 illustrates an example method for providing artificial intelligence modeling related to microphones in accordance with one or more embodiments disclosed herein; and FIG. 9 illustrates another example method for providing artificial intelligence modeling related to microphones in accordance with one or more embodiments disclosed herein.

DETAILED DESCRIPTION

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements.

Overview

Noise is often introduced during audio capture related to telephone conversations, video chats, office conferencing scenarios, lecture hall microphone systems, broadcasting microphone systems, augmented reality applications, virtual reality applications, etc. In certain microphone systems, a beamforming microphone array may be employed to capture audio from one or more directions in an audio environment. However, noise is often present in an audio environment. Noise impacts intelligibility of speech and produces an undesirable experience for listeners.

Traditionally, digital signal processing may be performed with respect to beamforming microphone arrays to remove or suppress noise related to captured audio. Traditional beamforming techniques often involve numerous microphone elements, expensive hardware, and/or manual setup for beam steering or microphone placement in an audio environment. As such, it is desirable to reduce the effect of noise in an audio environment while also reducing the number of microphone elements in a microphone system, reducing cost of hardware for the microphone system, and/or removing manual intervention to configure the microphone system.

To address these and/or other technical problems associated with microphone systems, various examples disclosed herein provide for isolating audio signals related to audio sources within an audio environment. In some examples, one or more artificial intelligence (AI) techniques and/or one or more machine learning techniques may be employed to isolate audio signals related to audio sources within an audio environment. For example, an AI-based approach may be employed to capture, process, and/or isolate localized audio sources in an audio environment using two or more capture devices. The two or more capture devices may be two or more component capture device and may include one or more audio capture devices (e.g., one or more microphones), one or more vision devices, one or more video capture devices, one or more infrared capture devices, one or more ultrasound devices, one or more radar devices, one or more light detecting and ranging (LiDAR) device, one or more sensor devices, and/or one or more other types of capture devices for audio and/or video. For example, the two or more capture devices may be two or more microphones. However, in another example, the two or more capture devices may include at least one microphone and at least one video capture device related to a multi-sensor audio capturing implementation. Respective signals from the capture devices may be provided as input to one or more deep neural networks trained to predict location, class, and/or localized audio signal representations (e.g., waveforms, spectrograms, audio components, etc.) for one or more audio sources. The respective signals may be, for example, respective digitized audio signals or other audio signals formatted for processing by the one or more deep neural networks.

The one or more deep neural networks may predict location, class, and/or localized source waveforms. The one or more deep neural networks may also provide an end-to-end AI-driven approach to capture audio sources and/or spatial metadata in an audio environment with two or more microphone sensors in one or more physical devices. The two or more microphone sensors and/or the one or more deep neural networks may also be configurable based on an audio environment to allow extraction of audio content across the entire audio environment, rather than a target location subset within the audio environment.

In some examples, one or more models for the one or more deep neural networks may be pre-trained to localize sounds in an audio environment based on two-dimensional (2D) polar coordinates and/or three-dimensional (3D) coordinates such as x, y, z positions in the audio environment. The one or more models for the one or more deep neural networks may be additionally or alternatively pre-trained to classify sounds such as speech, typing sounds, eating sounds, and/or other sounds. The one or more models for the one or more deep neural networks may also be pre-trained to predict (e.g., isolate and/or regenerate) sounds at respective predicted locations to output the predicted sounds with reduced noise.

The one or more models may be one or more AI models. In some examples, the one or more models may include a source localizer model (e.g., a source localization and classification model) and one or more source generator models (e.g., one or more source sound separation models). The source localizer model may be an AI-based multi-microphone model configured to predict a location and/or a class of respective sounds in an audio environment. The one or more source generator models may be one or more AI-based multi-microphone models configured to extract high-quality sound from any 3D location in an audio environment. For example, given a 3D location in an audio environment as input, the one or more source generator models may predict sound at the 3D location in the audio environment.

In some examples, the one or more source generator models may be trained based on various audio sources distributed in a particular audio environment (e.g., a realistic room audio environment) to predict sound emitted from various respective input coordinates. Additionally, the source localizer model and the one or more source generator models may be combined into an audio signal isolation system to provide separated and/or spatialized sources based on fixed microphone signals.

In some examples, the separated and/or spatialized sources may be provided via regeneration by subtraction. For example, respective audio signals provided to the one or more deep neural networks may be regenerated and a signal associated with undesirable sound (e.g., an unwanted signal, a noise signal, etc.) may be subtracted from one or more original audio signals to produce an output audio without the undesirable sound.

Audio processing such as, for example, audio signal isolation processing as disclosed herein, may be performed without employing traditional audio microphone beamforming techniques. For instance, audio processing as disclosed herein may perform learning to provide optimal predictions of locations and/or classifications related to sounds. Improved separation with respect to noises and/or spatialization of audio sources with respect to noises may also be provided. Moreover, audio processing as disclosed herein may reduce the effect of noise in an audio environment while also reducing the number of microphone elements (e.g., microphone sensors), reducing cost of hardware for the microphone system, and/or removing manual intervention for providing improved separation with respect to noises and/or spatialization of audio sources.

Exemplary Audio Signal Isolation Systems and Methods

FIG. 1 illustrates an audio signal processing system 100 that is configured to provide audio signal isolation according to one or more embodiments of the present disclosure. The audio signal processing system 100 may be, for example, a conferencing system (e.g., a conference audio system, a video conferencing system, a digital conference system, etc.), an audio performance system, an audio recording system, a music performance system, a music recording system, a digital audio workstation, a lecture hall microphone systems, a broadcasting microphone system, an augmented reality system, a virtual reality system, an online gaming system, or another type of audio system. Additionally, the audio signal processing system 100 may be implemented as an audio signal processing apparatus and/or as software that is configured for execution on a smartphone, a laptop, a personal computer, a digital conference system, a wireless conference unit, an audio workstation device, an augmented reality device, a virtual reality device, a recording device, headphones, earphones, speakers, or another device.

The audio signal processing system 100 may provide improved audio quality for microphone signals in an audio environment. An audio environment may be an indoor environment, an outdoor environment, a room, a performance hall, a broadcasting environment, a virtual environment, or another type of audio environment. In some examples, the audio signal processing system 100 may be configured to remove or suppress noise from microphone signals via audio signal modeling. In some examples, the audio signal processing system 100 may remove noise from speech-based audio signals captured via two or more microphones located within an audio environment. For example, an improved audio processing system may be incorporated into microphone hardware for use when a microphone is in a "speech" mode. Additionally, in some examples, the audio signal processing system 100 may remove noise, reverberation, and/or other audio artifacts from non-speech audio signals such as music, precise audio analysis applications, public safety tools, sporting event audio, or other non-speech audio.

The audio signal processing system 100 comprises two or more capture devices (e.g., two or more component capture devices). In the example illustrated in FIG. 1, the capture devices are microphones 102*a-n* that provide a multi-microphone setup for the audio environment, where n is an integer greater than or equal to 2. However, it is to be appreciated that, in certain examples, the capture devices may additionally or alternatively include one or more video capture devices, one or more infrared capture devices, one or more sensor devices, and/or one or more other types of audio capture devices. The audio signal processing system 100 also comprises an audio signal isolation system 104. The two or more microphones 102*a-n* may respectively be audio capturing devices such as, for example, microphone sensors, configured for capturing audio by converting sound into one or more electrical signals. In some examples, audio captured by the two or more microphones 102*a-n* may be converted into two or more digitized audio signals 106*a-n*. For example, audio captured by the microphone 102*a* may be converted into a digitized audio signal 106*a*, audio captured by the microphone 102*n* may be converted into a digitized audio signal 106*n*, etc. The two or more microphones 102*a-n* may respectively correspond to a condenser microphone, a micro-electromechanical systems (MEMS) microphone, a dynamic microphone, a piezoelectric microphone, an array microphone, one or more beamformed lobes of an array microphone, a linear array microphone, a ceiling array microphone, a table array microphone, a virtual microphone, a network microphone, a ribbon microphone, or another type of microphones configured to capture audio. Additionally, the two or more microphones 102*a-n* may be positioned within a particular audio environment.

In a non-limiting example, the two or more microphones 102*a-n* may be eight microphones configured in a fixed geometry (e.g., seven microphones configured along a circumference of a circle and one microphone in the center of the circle). However, it is to be appreciated that, in certain examples, the two or more microphones 102*a-n* may be configured in a different manner within an audio environment.

In some examples, the two or more digitized audio signals 106*a-n* may be aggregated and divided into discrete segments of time for processing by the audio signal isolation system 104. The audio signal isolation system 104 may apply time shifting to the discrete segments to transform the discrete segments into position adjusted segments. For example, the audio signal isolation system 104 may shift the discrete segments of the two or more digitized audio signals 106*a-n* based on a location of a microphone associated with the respective digitized audio signals 106*a-n*. The location is relative to a target location of sound (e.g., an x coordinate, a y coordinate, and/or a z coordinate) in the audio environment.

The audio signal isolation system 104 may employ one or more audio signal modeling techniques to predict location, classification, and/or localized source waveforms or other audio signal representations associated with the two or more digitized audio signals 106*a-n*. In this regard, the audio signal isolation system 104 may determine one or more isolated audio signals 108*a-m* based on the two or more digitized audio signals 106*a-n*. The one or more isolated audio signals 108*a-m* may be high-fidelity audio with suppressed or minimal noise and/or other audio enhancements determined based on predicted location, classification, and/or localized source waveforms associated with the two or more digitized audio signals 106*a-n*.

The one or more isolated audio signals 108*a-m* may be respectively configured as an object-based audio sample associated with an audio coding standard such as, for example, MPEG-H. Furthermore, the audio signal isolation system 104 may generate the one or more isolated audio signals 108*a-m* without employing traditional beamforming techniques. In some examples, an audio coding module may receive and/or encode the one or more isolated audio signals 108*a-m* to provide the one or more isolated audio signals 108*a-m* as an object-based audio sample associated with an audio coding standard. Additionally, the one or more isolated audio signals 108*a-m* configured as respective object-based audio samples may be transmitted to a receiver device configured to decode the one or more isolated audio signals 108*a-m*.

In some examples, the one or more isolated audio signals 108*a-m* may be transmitted to respective output channels for further audio signal processing and/or output via a listening device such as headphones, earphones, speakers, or another type of listening device. In some examples, the one or more isolated audio signals 108*a-m* may be transmitted to one or more subsequent digital signal processing stages and/or one or more subsequent AI processes. In some examples, the one or more isolated audio signals 108*a-m* may be transmitted with respective time and/or location information to facilitate reconstruction of a 3D audio scene for the audio environment (e.g., by a receiver device).

The one or more isolated audio signals 108*a-m* may be encoded audio signals. In some examples, the one or more isolated audio signals 108*a-m* may be encoded in a 3D audio format (e.g., MPEG-H, a 3D audio format related to ISO/IEC 23008-3, another type of 3D audio format, etc.). The one or more isolated audio signals 108*a-m* may also be configured for reconstruction by one or more receivers. For example, the one or more isolated audio signals 108*a-m* may be configured for one or more receivers associated with a teleconferencing system, a video conferencing system, a virtual reality system, an online gaming system, a metaverse system, a recording system, and/or another type of system. In some examples, the one or more receivers may be one or more far-end receivers configured for real-time spatial scene reconstruction. Additionally, the one or more receivers may be one or more codecs configured for teleconferencing (e.g., 2D teleconferencing or 3D teleconferencing), videoconferencing (e.g., 2D videoconferencing or 3D videoconferencing), one or more virtual reality applications, one or more online gaming applications, one or more recording applications, and/or one or more other types of codecs. In some examples, a recording device of a recording system may be configured for playback based on the 3D audio format. A recording device of a recording system may additionally or alternatively be configured for playback associated with teleconferencing (e.g., 2D teleconferencing or 3D teleconferencing), videoconferencing (e.g., 2D videoconferencing or 3D videoconferencing), virtual reality, online gaming, a metaverse, and/or another type of audio application.

In some examples, the two or more digitized audio signals 106*a-n* captured by the two or more microphones 102*a-n* may be regenerated and an undesirable sound signal (e.g., an unwanted sound signal, a noise signal, etc.) associated with the audio environment may be subtracted from at least one digitized audio signal of the two or more digitized audio signals 106*a-n* to generate a source isolated audio output component of the one or more isolated audio signals 108*a-m*.

In some examples, an isolated audio signal from one or more isolated audio signals 108*a-m* may be based on selection criteria. The selection criteria may be associated with a particular geofencing location (e.g., a particular zone) within the audio environment to be provided via an output channel, a particular class of audio (e.g., a user-specified class of audio or an engineer-specified class of audio) to be provided via an output channel, a particular channelization purpose (e.g., audio panel vs. audience, performer vs. audience, etc.), a particular submixing application (e.g., for isolating and subsequently combining audio from certain areas of the audio environment), a particular post-processing application (e.g., applying gain, equalization, attenuation, alternation, and/or another type of post-processing to certain audio sources within the audio environment) based on direction or distance from a capture device, etc.

The audio signal isolation system 104 comprises a source localizer model 110 and one or more source generator models 112. The source localizer model 110 may be configured to predict a location and/or a classification for a respective audio source associated with the two or more digitized audio signals 106*a-n*. For example, the source localizer model 110 may be trained to predict a location and/or a classification for audio sources in the audio environment relative to a position and/or an orientation of at least one microphone from the two or more microphones 102*a-n*.

In an example, the source localizer model 110 may provide Vector Symbolic Architecture (VSA) encodings for the location and/or classification for the audio sources. A number of location and/or classification predictions (e.g., a number of VSA encodings) may be based on a number of audio sources located in the audio environment. In some examples, the classification for the audio sources may include an audio class (e.g., a first type of audio source or a second type of audio source), a speech class (e.g., a first type of user class or a second type of user class), an equalization class (e.g., a low frequency class, a middle frequency class, a high frequency class, etc.), and/or another type of classification for the audio sources.

The source localizer model 110 may be an AI model (e.g., a machine learning model). In some examples, the source localizer model 110 may be a neural network model such as, for example, a U-NET-based neural network model configured predict a location and/or a classification for audio sources.

The one or more source generator models 112 may be configured to separate audio sources associated with respective locations within an audio environment from the two or more digitized audio signals 106*a-n*. The one or more source generator models 112 may also be configured to remove noise from the audio sources and/or enhance audio quality of the audio sources. An audio source may be a sound source associated with speech or other non-speech audio such as a music source, a sporting event audio source, or other desirable non-speech audio for a listener. The one or more source generator models 112 may provide isolated audio or enhanced audio (e.g., de-reverbed audio, compressed audio, audio altered based on one or more audio effects, etc.) such that, in certain examples, the one or more source generator models 112 may be configured as a generator model, an isolator model rather than a generator model, or both a generator and isolator model.

In some examples, the one or more source generator models 112 may receive the two or more digitized audio signals 106*a-n* and data provided by the source localizer model 110 as input to the one or more source generator models 112. The data provided by the source localizer model 110 may include respective locations and/or classifications for the audio sources. In some examples, the data provided by the source localizer model 110 may include the VSA encodings determined by the source localizer model 110. In some examples, for every prediction of a target audio source class (e.g., speech) and an associated location determined by the source localizer model 110, a respective source generator model 112 may be executed.

The one or more source generator models 112 may be trained to isolate and/or generate a class of sound for specific location coordinates within an audio environment, such that the one or more source generator models 112 respectively outputs sound only from one or more target locations within the audio environment. In some examples, the one or more source generator models 112 may be trained to generate a class of sound for audio output only from a location, such that a respective source generator model 112 may learn to actively remove sounds outside of a location, reverberation of the target source, and/or an undesired noise collocated with the target class source at the target location. For example, the one or more source generator models 112 may be trained to select a particular class of sound (e.g., from a set of classes determined by the source localizer model 110) for output and/or further audio enhancement based on location data provided by the source localizer model 110. The one or more source generator models 112 may respectively be AI models (e.g., machine learning models). In some examples, the one or more source generator models 112 may respectively be a neural network model such as, for example, a U-NET-based neural network model configured to isolate and/or generate a class of sound for specific location coordinates within an audio environment.

In an example, where more than one desired target location is predicted in a time segment by the source localizer model 110, then more than one source generator model 112 may be executed in parallel where each source generator model 112 is provided the same digitized audio signal input but different target locations. In an alternate example, the one or more source generator models 112 may be configured as a single source generator model that predicts multiple location sources.

In some examples, the audio signal isolation system 104 may track locations of audio sources within the audio environment over an interval of time such that jitter at the locations is reduced and/or output channels are respectively configured based on the locations.

FIG. 2 illustrates an example audio signal processing apparatus 152 configured in accordance with one or more embodiments of the present disclosure. The audio signal processing apparatus 152 may be configured to perform one or more techniques described in FIG. 1 and/or one or more other techniques described herein. In one or more embodiments, the audio signal processing apparatus 152 may be embedded in the audio signal isolation system 104.

In some cases, the audio signal processing apparatus 152 may be a computing system communicatively coupled with, and configured to control, one or more circuit modules associated with wireless audio processing. For example, the audio signal processing apparatus 152 may be a computing system communicatively coupled with one or more circuit modules related to wireless audio processing. The audio signal processing apparatus 152 may comprise or otherwise be in communication with a processor 154, a memory 156, audio signal modeling circuitry 158, audio processing circuitry 160, input/output circuitry 162, and/or communications circuitry 164. In some examples, the processor 154 (which may comprise multiple or co-processors or any other processing circuitry associated with the processor) may be in communication with the memory 156.

The memory 156 may comprise non-transitory memory circuitry and may comprise one or more volatile and/or non-volatile memories. In some examples, the memory 156 may be an electronic storage device (e.g., a computer readable storage medium) configured to store data that may be retrievable by the processor 154. In some examples, the data stored in the memory 156 may comprise radio frequency signal data, audio data, stereo audio signal data, mono audio signal data, or the like, for enabling the apparatus to carry out various functions or methods in accordance with embodiments of the present disclosure, described herein.

In some examples, the processor 154 may be embodied in a number of different ways. For example, the processor 154 may be embodied as one or more of various hardware processing means such as a central processing unit (CPU), a microprocessor, a coprocessor, a digital signal processor (DSP), an Advanced RISC Machine (ARM), a field programmable gate array (FPGA), a neural processing unit (NPU), a graphics processing unit (GPU), a system on chip (SoC), a cloud server processing element, a controller, or a processing element with or without an accompanying DSP. The processor 154 may also be embodied in various other processing circuitry including integrated circuits such as, for example, a microcontroller unit (MCU), an ASIC (application specific integrated circuit), a hardware accelerator, a cloud computing chip, or a special-purpose electronic chip. Furthermore, in some examples, the processor 154 may comprise one or more processing cores configured to perform independently. A multi-core processor may enable multiprocessing within a single physical package. Additionally or alternatively, the processor 154 may comprise one or more processors configured in tandem via the bus to enable independent execution of instructions, pipelining, and/or multithreading.

In an example embodiment, the processor 154 may be configured to execute instructions, such as computer program code or instructions, stored in the memory 156 or otherwise accessible to the processor 154. Alternatively or additionally, the processor 154 may be configured to execute hard-coded functionality. As such, whether configured by hardware or software instructions, or by a combination thereof, the processor 154 may represent a computing entity (e.g., physically embodied in circuitry) configured to perform operations according to an embodiment of the present disclosure described herein. For example, when the processor 154 is embodied as an CPU, DSP, ARM, FPGA, ASIC, or similar, the processor may be configured as hardware for conducting the operations of an embodiment of the present disclosure. Alternatively, when the processor 154 is embodied to execute software or computer program instructions, the instructions may specifically configure the processor 154 to perform the algorithms and/or operations described herein when the instructions are executed. However, in some cases, the processor 154 may be a processor of a device specifically configured to employ an embodiment of the present disclosure by further configuration of the processor using instructions for performing the algorithms and/or operations described herein. The processor 154 may further comprise a clock, an arithmetic logic unit (ALU) and logic gates configured to support operation of the processor 154, among other things.

In one or more examples, the audio signal processing apparatus 152 may comprise the audio signal modeling circuitry 158. The audio signal modeling circuitry 158 may be any means embodied in either hardware or a combination of hardware and software that is configured to perform one or more functions disclosed herein related to the audio signal isolation system 104. In one or more embodiments, the audio signal processing apparatus 152 may comprise the audio processing circuitry 160. The audio processing circuitry 160 may be any means embodied in either hardware or a combination of hardware and software that is configured to perform one or more functions disclosed herein related to audio processing of audio signals received from microphones such as, for example, the two or more microphones 102*a-n*.

In some examples, the audio signal processing apparatus 152 may comprise the input/output circuitry 162 that may, in turn, be in communication with processor 154 to provide output to the user and, in some examples, to receive an indication of a user input. The input/output circuitry 162 may comprise a user interface and may comprise a display. In some examples, the input/output circuitry 162 may also comprise a keyboard, a touch screen, touch areas, soft keys, buttons, knobs, or other input/output mechanisms.

In some examples, the audio signal processing apparatus 152 may comprise the communications circuitry 164. The communications circuitry 164 may be any means embodied in either hardware or a combination of hardware and software that is configured to receive and/or transmit data from/to a network and/or any other device or module in communication with the audio signal processing apparatus 152. In this regard, the communications circuitry 164 may comprise, for example, an antennae or one or more other communication devices for enabling communications with a wired or wireless communication network. For example, the communications circuitry 164 may comprise antennae, one or more network interface cards, buses, switches, routers, modems, and supporting hardware and/or software, or any other device suitable for enabling communications via a network. Additionally or alternatively, the communications circuitry 164 may comprise the circuitry for interacting with the antenna/antennae to cause transmission of signals via the antenna/antennae or to handle receipt of signals received via the antenna/antennae.

FIG. 3 illustrates a subsystem 200 for audio signal isolation that is configured to provide audio signal modeling related to localization and/or classification according to one or more embodiments of the present disclosure. The subsystem 200 comprises the source localizer model 110. The subsystem 200 may receive two or more audio data objects 206*a-n*. Each of the audio data objects 206*a-n* may comprise respective digitized audio signals 106*a-n* captured by a microphone of the two or more microphones 102*a-n*. Additionally or alternatively, each of the audio data objects 206*a-n* may comprise a transformation of the respective digitized audio signals 106*a-n* such as, for example, a wavelet audio representation, a short-term Fourier transform (STFT) representation, or another type of audio transformation representation. The two or more audio data objects 206*a-n* may be provided as input to the source localizer model 110.

In some examples, the source localizer model 110 may be configured to generate, based on the audio data objects 206*a-n*, one or more audio source position estimate objects 208*a-x*. An audio source position estimate object may comprise a location of an audio source associated with the two or more digitized audio signals 106*a-n*. For example, a location of an audio source may be a 2D location associated with 2D polar coordinates within the audio environment. Alternatively, a location of an audio source may be a 3D location associated with 3D coordinates (e.g., an x coordinate, a y coordinate, and a z coordinate) within the audio environment.

FIG. 4 illustrates a subsystem 300 for audio signal isolation that is configured to provide audio signal modeling related to separation and/or spatialization of audio sources according to one or more embodiments of the present disclosure. The subsystem 300 comprises one or more source generator models 112*a-x*. Respective audio source position estimate objects of the one or more audio source position estimate objects 208*a-x* and/or respective audio data objects of the two or more audio data objects 206*a-n* may be provided to the respective one or more source generator models 112*a-x*. In some examples, an audio source position estimate object of the one or more audio source position estimate objects 208*a-x* may be identified for a respective source generator model of the one or more source generator models 112*a-x* based on a decoding module configured to decode respective vectors associated with the one or more audio source position estimate objects 208*a-x*.

A respective source generator model may be configured to generate, based on the respective audio source position estimate object, a respective source isolated audio output component 308*a-x*. A respective source isolated audio output component 308*a-x* may comprise one or more isolated audio signals (e.g., the one or more isolated audio signals 108*a-m*) associated with an audio source within the audio environment. In some examples, the respective one or more source generator models 112*a-x* may additionally receive data for a target class associated with the two or more audio data objects 206*a-n*. In some examples, a respective source isolated audio output component 308*a-x* may be encoded in a 3D audio format.

In some examples, the one or more source generator models 112*a-x* may be a plurality of source generator models executing in parallel. For example, each audio source position estimate object of the one or more audio source position estimate objects 208*a-x* may be provided as input to a respective source generator model of the plurality of source generator models executing in parallel. Each respective source generator model may be configured to generate, based on the audio source position estimate object, a respective source isolated audio output component from the source isolated audio output components 308*a-x*.

In some examples, prior to providing the one or more audio source position estimate objects 208*a-x* to the one or more source generator models 112*a-x*, respective audio source position estimate objects of the one or more audio source position estimate objects 208*a-x* may be transformed into a position adjusted object by shifting one or more samples of the digitized audio signals 106*a-n* associated with the one or more audio source position estimate objects 208*a-x* based on a location of a corresponding microphone. The transformation of the respective audio source position estimate objects may be performed based on a determined or known microphone location with respect to an estimated audio source. A microphone location may be measured, for example, in samples per shift. For example, a distance to a microphone may be calculated based on an amount of time required for sound to reach a microphone and the amount of time may be converted into a sample length value.

In some examples, the audio signal isolation system 104, the subsystem 200, and/or the subsystem 300 may receive one or more video data objects. Each video data objects may comprise one or more digitized video signals captured by one or more video capture devices. Each of the video data objects may be provided as input to the source localizer model 110 and/or the one or more source generator models 112*a-x*. For example, the one or more video data objects and the two or more audio data objects 206*a-n* may be provided as input to the source localizer model 110 to generate the one or more audio source position estimate objects 208*a-x*. Additionally or alternatively, the one or more video data objects, the two or more audio data objects 206*a-n*, and each audio source position estimate object of the one or more audio source position estimate objects 208*a-x* may be provided as input to the one or more source generator models 112*a-x* to generate the source isolated audio output components 308*a-x*. In some examples, the one or more video data objects may include a set of video features associated with one or more digitized audio signals. In some examples, the set of video features may include one or more facial recognition features associated with an audio source (e.g., a speaker) in the audio environment.

FIG. 5 illustrates a subsystem 400 for audio signal isolation that is configured to provide audio signal modeling related to separation and/or spatialization of audio sources according to one or more embodiments of the present disclosure. The subsystem 400 may be an alternate embodiment of the subsystem 300 such that a single source generator model is employed for separation and/or spatialization of audio sources. The subsystem 400 comprises a multi-position trained source generator model 402. Respective audio source position estimate objects of the one or more audio source position estimate objects 208*a-x* and/or respective audio data objects of the two or more audio data objects 206*a-n* may be provided to the multi-position trained source generator model 402. In some examples, a selected audio source position estimate object of the one or more audio source position estimate objects 208*a-x* may be provided as input to the multi-position trained source generator model 402. For example, an audio source position estimate object of the one or more audio source position estimate objects 208*a-x* may be selected based on a decoding module configured to decode respective vectors associated with the one or more audio source position estimate objects 208*a-x*. In some examples, the multi-position trained source generator model 402 may additionally receive data for a target class associated with the two or more audio data objects 206*a-n*. The multi-position trained source generator model 402 may be configured to generate, based on the selected sound source position estimate object, a source isolated audio output component 308. The source isolated audio output component 308 may comprise isolated audio signals associated with an audio source within the audio environment. In some examples, the source isolated audio output component 308 may be encoded in a 3D audio format.

FIG. 6 illustrates an exemplary audio environment 500 according to one or more embodiments of the present disclosure. The audio environment 500 may be an indoor environment, an outdoor environment, a room, a performance hall, a broadcasting environment, a virtual environment, or another type of audio environment. The audio environment 500 may include one or more audio sources and one or more noise sources. In a non-limiting example, the audio environment 500 comprises an audio source 502 (e.g., a first person that provides first speech), an audio source 505 (e.g., a second person that provides second speech), and a noise source 506 (e.g., undesirable background noise, a typing sound, a paper crinkling sound, pet noise, room noise floor, reverb, etc.). In some examples, the two or more microphones 102*a-n* may be configured to extract audio content across the entire audio environment 500. For example, the two or more microphones 102*a-n* may be configured in a fixed geometry microphone arrangement (e.g., a constellation microphone arrangement) to extract audio content across the entire audio environment 500.

FIG. 7 illustrates an audio signal processing system 600 that provides audio source separation for one or more audio sources in an audio environment according to one or more embodiments of the present disclosure. The audio signal processing system 600 may illustrate end-to-end audio signal processing with respect to the audio environment 500 to provide audio source separation for one or more audio sources in the audio environment 500. The audio signal processing system 600 includes the audio environment 500, the two or more microphones 102*a-n*, and/or the audio signal isolation system 104.

The two or more microphones 102*a-n* may be configured to capture audio environment content from the audio environment 500 to generate the two or more digitized audio signals 106*a-n*. In an example, the two or more microphones 102*a-n* may be arranged within the audio environment 500 to capture the audio environment content associated with the audio environment 500. Based on the two or more digitized audio signals 106*a-n* associated with the audio environment content from the audio environment 500, the audio signal isolation system 104 may provide audio source separation of one or more audio sources within the audio environment 500. For example, the audio signal isolation system 104 may separate and/or spatialize the audio source 502 and the audio source 504 within the audio environment 500 using one or more audio signal modeling techniques, as more fully disclosed herein.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time.

In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 8 is a flowchart diagram of an example process 700, for providing artificial intelligence modeling related to microphones, in accordance with, for example, an audio signal processing apparatus 152 illustrated in FIG. 2. Via the various operations of the process 700, the audio signal processing apparatus 152 may enhance quality and/or reliability of audio associated with an audio environment. The process 700 begins at operation 702 that receives a plurality of audio data objects, where each audio data object of the plurality of audio data objects comprises digitized audio signals captured by a capture device of two or more capture devices positioned within an audio environment. The process 700 also includes an operation 704 that inputs the audio data objects to a source localizer model that is configured to generate, based on the audio data objects, one or more audio source position estimate objects. The process 700 also includes an operation 706 that inputs the audio data objects and/or each audio source position estimate object of the one or more audio source position estimate objects to a respective source generator model of one or more source generator models, where the respective source generator model is configured to generate, based on the audio source position estimate object, a source isolated audio output component, and the source isolated audio output component comprises isolated audio signals associated with an audio source within the audio environment.

FIG. 9 is a flowchart diagram of an example process 800, for providing an alternate embodiment for artificial intelligence modeling related to microphones, in accordance with, for example, the audio signal processing apparatus 152 illustrated in FIG. 2. Via the various operations of the process 800, the audio signal processing apparatus 152 may enhance quality and/or reliability of audio associated with an audio environment. The process 800 begins at operation 802 that receives a plurality of audio data objects, where each audio data object of the plurality of audio data objects comprises digitized audio signals recorded by a capture device of two or more capture devices positioned within an audio environment. The process 800 also includes an operation 804 that inputs the audio data objects to a first machine learning model that is configured to generate, based on the audio data objects, one or more audio source position estimate objects. The process 800 also includes an operation 806 that inputs the audio data objects and/or a selected audio source position estimate object of the one or more audio source position estimate objects to a multi-position trained source generator model, where the multi-position trained source generator model is configured to generate, based on the selected audio source position estimate object, a source isolated audio output component, and the source isolated audio output component comprises isolated audio signals associated with an audio source within the audio environment.

Although example processing systems have been described in the figures herein, implementations of the subject matter and the functional operations described herein may be implemented in other types of digital electronic circuitry, or in computer software, firmware, or hardware, including the structures disclosed in this specification and their structural equivalents, or in combinations of one or more of them.

Embodiments of the subject matter and the operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer programs, i.e., one or more modules of computer program instructions, encoded on computer-readable storage medium for execution by, or to control the operation of, information/data processing apparatus. Alternatively, or in addition, the program instructions may be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium may be, or be included in, a computer-readable storage device, a computer-readable storage substrate, a random or serial access memory array or device, or a combination of one or more of them. Moreover, while a computer-readable storage medium is not a propagated signal, a computer-readable storage medium may be a source or destination of computer program instructions encoded in an artificially-generated propagated signal. The computer-readable storage medium may also be, or be included in, one or more separate physical components or media (e.g., multiple CDs, disks, or other storage devices).

A computer program (also known as a program, software, software application, script, or code) may be written in any form of programming language, including compiled or interpreted languages, declarative or procedural languages, and it may be deployed in any form, including as a standalone program or as a module, component, subroutine, object, or other unit suitable for use in a computing environment. A computer program may, but need not, correspond to a file in a file system. A program may be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

The term “or” is used herein in both the alternative and conjunctive sense, unless otherwise indicated. The terms “illustrative,” “example,” and “exemplary” are used to be examples with no indication of quality level. Like numbers refer to like elements throughout.

The term “comprising” means “including but not limited to,” and should be interpreted in the manner it is typically used in the patent context. Use of broader terms such as comprises, includes, and having should be understood to provide support for narrower terms, such as consisting of, consisting essentially of, comprised substantially of, and/or the like.

The phrases “in one embodiment,” “according to one embodiment,” and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

While this specification contains many specific implementation details, these should not be construed as limitations on the scope of any disclosures or of what may be claimed, but rather as description of features specific to particular embodiments of particular disclosures. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a product or packaged into multiple products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Hereinafter, various characteristics will be highlighted in a set of numbered clauses or paragraphs. These characteristics are not to be interpreted as being limiting on the disclosure or inventive concept, but are provided merely as a highlighting of some characteristics as described herein, without suggesting a particular order of importance or relevancy of such characteristics.

Clause 1. An audio signal processing apparatus comprising at least one processor and a memory storing instructions that are operable, when executed by the processor, to cause the audio signal processing apparatus to: receive a plurality of audio data objects.

Clause 2. The audio signal processing apparatus of clause 1, wherein each audio data object of the plurality of audio data objects comprises digitized audio signals captured by a capture device of two or more capture devices positioned within an audio environment.

Clause 3. The audio signal processing apparatus of any of the preceding clauses, wherein the instructions are further operable to cause the audio signal processing apparatus to: input the audio data objects to a source localizer model that is configured to generate, based on the audio data objects, one or more audio source position estimate objects.

Clause 4. The audio signal processing apparatus of any of the preceding clauses, wherein the instructions are further operable to cause the audio signal processing apparatus to: input the audio data objects and each audio source position estimate object of the one or more audio source position estimate objects to a source generator model of one or more source generator models.

Clause 5. The audio signal processing apparatus of any of the preceding clauses, wherein the source generator model is configured to generate, based on the audio source position estimate object, a source isolated audio output component.

Clause 6. The audio signal processing apparatus of any of the preceding clauses, wherein the source isolated audio output component comprises isolated audio signals associated with an audio source within the audio environment.

Clause 7. The audio signal processing apparatus of any of the preceding clauses, wherein the capture device is one or more of an audio capture device, a microphone, a vision device, a video capture device, an infrared device, an ultrasound device, a radar device, a LiDAR device, or a combination thereof.

Clause 8. The audio signal processing apparatus of any of the preceding clauses, wherein the instructions are further operable to cause the audio signal processing apparatus to: transform each audio source position estimate object into a position adjusted object by shifting one or more samples of the digitized audio signals associated with the audio source position estimate object based on a location of the capture device associated with the audio data object.

Clause 9. The audio signal processing apparatus of any of the preceding clauses, wherein the instructions are further operable to cause the audio signal processing apparatus to: train each of the one or more source generator models using a corresponding training data set.

Clause 10. The audio signal processing apparatus of any of the preceding clauses, wherein the instructions are further operable to cause the audio signal processing apparatus to: input position data along with or as part of the audio source position estimate object to the one or more source generator models.

Clause 11. The audio signal processing apparatus of any of the preceding clauses, wherein the instructions are further operable to cause the audio signal processing apparatus to: configure the one or more source generator models as a multi-position trained source generator model.

Clause 12. The audio signal processing apparatus of any of the preceding clauses, wherein the instructions are further operable to cause the audio signal processing apparatus to: train each of the source generator models specific to a different location within the audio environment.

Clause 13. The audio signal processing apparatus of any of the preceding clauses, wherein the instructions are further operable to cause the audio signal processing apparatus to: receive acoustic signals from one or more audio sources within the audio environment.

Clause 14. The audio signal processing apparatus of any of the preceding clauses, wherein the instructions are further operable to cause the audio signal processing apparatus to: transform the acoustic signals into the plurality of audio data objects by digitizing the acoustic signals.

Clause 15. The audio signal processing apparatus any of the preceding clauses, wherein the source localizer model is configured as a neural network model.

Clause 16. The audio signal processing apparatus of any of the preceding clauses, wherein the one or more source generator models are configured as one or more neural network models.

Clause 17. The audio signal processing apparatus of any of the preceding clauses, wherein the instructions are further operable to cause the audio signal processing apparatus to: train the source localizer model to estimate one or more audio source positions and associated audio classifications.

Clause 18. The audio signal processing apparatus of any of the preceding clauses, wherein the audio source position estimate object comprises location data and classification data for the audio source.

Clause 19. The audio signal processing apparatus of any of the preceding clauses, wherein the audio source position estimate object is structured as a Vector Symbolic Architecture encoding.

Clause 20. The audio signal processing apparatus of any of the preceding clauses, wherein the instructions are further operable to cause the audio signal processing apparatus to: identify the audio source position estimate object from the one or more audio source position estimate objects based on a decoding module.

Clause 21. The audio signal processing apparatus of any of the preceding clauses, wherein the source isolated audio output component comprises classification data and spatialization data for the audio source.

Clause 22. The audio signal processing apparatus of any of the preceding clauses, wherein the instructions are further operable to cause the audio signal processing apparatus to: determine position estimate data of the audio source position estimate object based on a position and orientation of the capture device.

Clause 23. The audio signal processing apparatus of any of the preceding clauses, wherein the instructions are further operable to cause the audio signal processing apparatus to: track locations of the audio source within the audio environment over an interval of time.

Clause 24. The audio signal processing apparatus of any of the preceding clauses, wherein the instructions are further operable to cause the audio signal processing apparatus to: predict locations of the audio source within the audio environment for a future instance in time.

Clause 25. The audio signal processing apparatus of any of the preceding clauses, wherein the instructions are further operable to cause the audio signal processing apparatus to: configure the one or more source generator models based on previously detected audio source location data.

Clause 26. The audio signal processing apparatus of any of the preceding clauses, wherein the source isolated audio output component is an object-based audio sample configured based on an audio coding standard.

Clause 27. The audio signal processing apparatus of any of the preceding clauses, wherein the instructions are further operable to cause the audio signal processing apparatus to: train the source localizer model based on previously determined audio data and simulated data to localize an audio location of audio sources and to classify an audio type of the audio sources.

Clause 28. The audio signal processing apparatus of any of the preceding clauses, wherein the instructions are further operable to cause the audio signal processing apparatus to: train the one or more source generator models based on previously determined audio data and simulated data to enhance audio output.

Clause 29. The audio signal processing apparatus of any of the preceding clauses, wherein the one or more source generator models comprise a plurality of source generator models, and wherein the instructions are further operable to cause the audio signal processing apparatus to: input each sound source position estimate object of the one or more sound source position estimate objects to a respective source generator model of the plurality of source generator models executing in parallel.

Clause 30. The audio signal processing apparatus of any of the preceding clauses, wherein the instructions are further operable to cause the audio signal processing apparatus to: output one or more isolated audio signals of the source isolated audio output component to an audio output device.

Clause 31. The audio signal processing apparatus of any of the preceding clauses, wherein the instructions are further operable to cause the audio signal processing apparatus to: select an isolated audio signal from the isolated audio signals based on selection criteria associated with a particular geofencing location within the audio environment.

Clause 32. The audio signal processing apparatus of any of the preceding clauses, wherein the instructions are further operable to cause the audio signal processing apparatus to: output the selected isolated audio signal to the audio output device.

Clause 33. The audio signal processing apparatus of any of the preceding clauses, wherein the instructions are further operable to cause the audio signal processing apparatus to: select an isolated audio signal from the isolated audio signals based on selection criteria associated with a particular location within the audio environment.

Clause 34. The audio signal processing apparatus of any of the preceding clauses, wherein the instructions are further operable to cause the audio signal processing apparatus to: apply post-processing to the selected isolated audio signal.

Clause 35. The audio signal processing apparatus of any of the preceding clauses, wherein the instructions are further operable to cause the audio signal processing apparatus to: select an isolated audio signal from the isolated audio signals based on selection criteria associated with a particular class of audio.

Clause 36. The audio signal processing apparatus of any of the preceding clauses, wherein the instructions are further operable to cause the audio signal processing apparatus to: output the selected isolated audio signal to the audio output device.

Clause 37. The audio signal processing apparatus of any of the preceding clauses, wherein the instructions are further operable to cause the audio signal processing apparatus to: regenerate the digitized audio signals captured by the capture device.

Clause 38. The audio signal processing apparatus of any of the preceding clauses, wherein the instructions are further operable to cause the audio signal processing apparatus to: subtract an undesirable sound signal associated with the audio environment from at least one digitized audio signal of the digitized audio signals to generate the source isolated audio output component.

Clause 39. The audio signal processing apparatus of any of the preceding clauses, wherein the source isolated audio output component is encoded in a 3D audio format.

Clause 40. The audio signal processing apparatus of any of the preceding clauses, wherein the instructions are further operable to cause the audio signal processing apparatus to: receive one or more video data objects.

Clause 41. The audio signal processing apparatus of any of the preceding clauses, wherein each video data object of the one or more video data objects comprises one or more digitized video signals captured by one or more video capture devices positioned within an audio environment.

Clause 42. The audio signal processing apparatus of any of the preceding clauses, wherein the instructions are further operable to cause the audio signal processing apparatus to: input the one or more video data objects, the audio data objects, and each audio source position estimate object of the one or more audio source position estimate objects to the source generator model.

Clause 43. A computer-implemented method related to any of the preceding clauses.

Clause 44. A computer program product, stored on a computer readable medium, comprising instructions that, when executed by one or more processors of the audio signal processing apparatus, cause the one or more processors to perform one or more operations related to any of the preceding clauses.

Clause 45. An audio signal processing apparatus comprising at least one processor and a memory storing instructions that are operable, when executed by the processor, to cause the audio signal processing apparatus to: receive a plurality of audio data objects.

Clause 46. The audio signal processing apparatus of any of the preceding clauses, wherein each audio data object of the plurality of audio data objects comprises digitized audio signals recorded by a capture device of two or more capture devices positioned within an audio environment.

Clause 47. The audio signal processing apparatus of any of the preceding clauses, wherein the instructions are further operable to cause the audio signal processing apparatus to: input the audio data objects to a first machine learning model that is configured to generate, based on the audio data objects, one or more audio source position estimate objects.

Clause 48. The audio signal processing apparatus of any of the preceding clauses, wherein the instructions are further operable to cause the audio signal processing apparatus to: input the audio data objects and a selected audio source position estimate object of the one or more audio source position estimate objects to a multi-position trained source generator model.

Clause 49. The audio signal processing apparatus of any of the preceding clauses, wherein the multi-position trained source generator model is configured to generate, based on the selected audio source position estimate object, a source isolated audio output component.

Clause 50. The audio signal processing apparatus of any of the preceding clauses, wherein the source isolated audio output component comprises isolated audio signals associated with an audio source within the audio environment.

Clause 51. The audio signal processing apparatus of any of the preceding clauses, wherein the instructions are further operable to cause the audio signal processing apparatus to: output one or more isolated audio signals of the source isolated audio output component to an audio output device.

Clause 52. A computer-implemented method related to any of the preceding clauses.

Clause 53. A computer program product, stored on a computer readable medium, comprising instructions that, when executed by one or more processors of the audio signal processing apparatus, cause the one or more processors to perform one or more operations related to any of the preceding clauses.

Clause 54. An audio signal processing apparatus comprising at least one processor and a memory storing instructions that are operable, when executed by the processor, to cause the audio signal processing apparatus to: receive at least one audio signal captured by at least one capture device.

Clause 55. The audio signal processing apparatus of clause 54, wherein the instructions are further operable to cause the audio signal processing apparatus to: input the at least one audio signal to a source localizer model that is configured to generate, based on the at least one audio signal, one or more audio source position estimates.

Clause 56. The audio signal processing apparatus of any of the preceding clauses, wherein the instructions are further operable to cause the audio signal processing apparatus to: input each audio signal and an associated audio source position estimate of the one or more audio source position estimates to a source generator model of one or more source generator models.

Clause 57. The audio signal processing apparatus of any of the preceding clauses, wherein each source generator model is configured to generate, based on the audio source position estimates, an isolated audio output.

Clause 58. The audio signal processing apparatus of any of the preceding clauses, wherein the instructions are further operable to cause the audio signal processing apparatus to: output one or more isolated audio signals of the source isolated audio output component to an audio output device.

Clause 59. A computer-implemented method related to any of the preceding clauses.

Clause 60. A computer program product, stored on a computer readable medium, comprising instructions that, when executed by one or more processors of the audio signal processing apparatus, cause the one or more processors to perform one or more operations related to any of the preceding clauses.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An audio signal processing apparatus comprising at least one processor and a memory storing instructions that are operable, when executed by the at least one processor, to cause the audio signal processing apparatus to:

receive a plurality of audio data objects, wherein each audio data object of the plurality of audio data objects comprises digitized audio signals captured by a capture device of two or more capture devices positioned within an audio environment;

input the plurality of audio data objects to a source localizer model that is configured to generate, based on the plurality of audio data objects, at least one audio source position estimate object that comprises a location of an audio source within the audio environment;

input (i) the plurality of audio data objects and (ii) the at least one audio source position estimate object generated by the source localizer model to a source generator model of one or more source generator models, wherein the source generator model is configured to generate, based on the at least one audio source position estimate object, a source isolated audio output component, and wherein the source isolated audio output component comprises at least one isolated audio signal associated with the audio source within the audio environment; and output the at least one isolated audio signal of the source isolated audio output component to an audio output device.

2. The audio signal processing apparatus of claim 1, wherein the instructions are further operable to cause the audio signal processing apparatus to:

transform the at least one audio source position estimate object into a position adjusted object by shifting one or more samples of the digitized audio signals associated with the at least one audio source position estimate object based on a location of the capture device.

3. The audio signal processing apparatus of claim 1, wherein the instructions are further operable to cause the audio signal processing apparatus to:

input position data along with or as part of the at least one audio source position estimate object to the one or more source generator models.

4. The audio signal processing apparatus of claim 1, wherein the instructions are further operable to cause the audio signal processing apparatus to:

configure the one or more source generator models as a multi-position trained source generator model.

5. The audio signal processing apparatus of claim 1, wherein the instructions are further operable to cause the audio signal processing apparatus to:

train each of the one or more source generator models specific to a different location within the audio environment.

6. The audio signal processing apparatus of claim 1, wherein the instructions are further operable to cause the audio signal processing apparatus to:

train the source localizer model to estimate one or more audio source positions and associated audio classifications.

7. The audio signal processing apparatus of claim 1, wherein the at least one audio source position estimate object comprises location data and classification data for the audio source.

8. The audio signal processing apparatus of claim 1, wherein the at least one audio source position estimate object is structured as a Vector Symbolic Architecture encoding.

9. The audio signal processing apparatus of claim 1, wherein the source isolated audio output component comprises classification data and spatialization data for the audio source.

10. The audio signal processing apparatus of claim 1, wherein the one or more source generator models comprise a plurality of source generator models, and wherein the instructions are further operable to cause the audio signal processing apparatus to:

input each audio source position estimate object of the at least one audio source position estimate object to a respective source generator model of the plurality of source generator models executing in parallel.

11. The audio signal processing apparatus of claim 1, wherein the instructions are further operable to cause the audio signal processing apparatus to:

select the at least one isolated audio signal from a plurality of isolated audio signals based on selection criteria associated with a particular geofencing location within the audio environment.

12. The audio signal processing apparatus of claim 1, wherein the instructions are further operable to cause the audio signal processing apparatus to:

select the at least one isolated audio signal from a plurality of isolated audio signals based on selection criteria associated with a particular class of audio.

13. The audio signal processing apparatus of claim 1, wherein the instructions are further operable to cause the audio signal processing apparatus to:

regenerate the digitized audio signals captured by the capture device; and subtract an undesirable sound signal associated with the audio environment from at least one digitized audio signal of the digitized audio signals to generate the source isolated audio output component.

14. The audio signal processing apparatus of claim 1, wherein the source isolated audio output component is encoded in a three-dimensional (3D) audio format.

15. The audio signal processing apparatus of claim 1, wherein the instructions are further operable to cause the audio signal processing apparatus to:

receive one or more video data objects, wherein each video data object of the one or more video data objects comprises one or more digitized video signals captured by one or more video capture devices positioned within an audio environment; and input the one or more video data objects, the plurality of audio data objects, and the at least one audio source position estimate object to the source generator model.

16. A computer-implemented method performed by an audio signal processing apparatus, comprising:

receiving a plurality of audio data objects, wherein each audio data object of the plurality of audio data objects comprises digitized audio signals captured by a capture device of two or more capture devices positioned within an audio environment;

inputting the plurality of audio data objects to a source localizer model that is configured to generate, based on the plurality of audio data objects, at least one audio source position estimate object that comprises a location of an audio source within the audio environment;

inputting (i) the plurality of audio data objects and (ii) the at least one audio source position estimate object generated by the source localizer model to a source generator model of one or more source generator models, wherein the source generator model is configured to generate, based on the at least one audio source position estimate object, a source isolated audio output component, and wherein the source isolated audio output component comprises at least one isolated audio signal associated with the audio source within the audio environment; and outputting the at least one isolated audio signal of the source isolated audio output component to an audio output device.

17. The computer-implemented method of claim 16, further comprising:

transforming the at least one audio source position estimate object into a position adjusted object by shifting one or more samples of the digitized audio signals associated with the at least one audio source position estimate object based on a location of the capture device.

18. The computer-implemented method of claim 16, further comprising:

inputting position data along with or as part of the at least one audio source position estimate object to the one or more source generator models.

19. The computer-implemented method of claim 16, further comprising:

selecting the at least one isolated audio signal from a plurality of isolated audio signals based on selection criteria associated with a particular geofencing location within the audio environment or a particular class of audio.

20. A computer program product, stored on a computer readable medium, comprising instructions that, when executed by one or more processors of an audio signal processing apparatus, cause the one or more processors to:

receive a plurality of audio data objects, wherein each audio data object of the plurality of audio data objects comprises digitized audio signals captured by a capture device of two or more capture devices positioned within an audio environment;

input the plurality of audio data objects to a source localizer model that is configured to generate, based on the plurality of audio data objects, at least one audio source position estimate object that comprises a location of an audio source within the audio environment;

input (i) the plurality of audio data objects and (ii) the at least audio source position estimate object generated by the source localizer model to a source generator model of one or more source generator models, wherein the source generator model is configured to generate, based on the at least one audio source position estimate object, a source isolated audio output component, and wherein the source isolated audio output component comprises at least one isolated audio signal associated with the audio source within the audio environment; and outputting the at least one isolated audio signal of the source isolated audio output component to an audio output device.

* * * * *